US012216282B2

(12) United States Patent
Aieta et al.

(10) Patent No.: US 12,216,282 B2
(45) Date of Patent: Feb. 4, 2025

(54) WAVEGUIDE DISPLAY WITH GAZE TRACKING (71) Applicant: Apple Inc., Cupertino, CA (US)

(72) Inventors: Francesco Aieta, Alameda, CA (US); Byron R. Cocilovo, Boulder, CO (US); Jonathan B. Pfeiffer, Lafayette, CO (US); Se Baek Oh, Hillsborough, CA (US)

( * ) Notice: Subject to any disclaimer, the term of this patent is extended or adjusted under 35 U.S.C. 154(b) by 0 days.

(21) Appl. No.: 18/262,902

(22) PCT Filed: Feb. 4, 2022

(86) PCT No.: PCT/US2022/015344
§ 371 (c)(1),
(2) Date: Jul. 25, 2023

(87) PCT Pub. No.: WO2022/173671
PCT Pub. Date: Aug. 18, 2022

(65) Prior Publication Data
US 2024/0103273 A1  Mar. 28, 2024

Related U.S. Application Data
(60) Provisional application No. 63/148,496, filed on Feb. 11, 2021.

(51) Int. Cl.
G02B 27/01       (2006.01)
F21V 8/00        (2006.01)
G02B 5/32        (2006.01)
G02B 27/00       (2006.01)

(52) U.S. Cl.
CPC .......... *G02B 27/0172* (2013.01); *G02B 5/32* (2013.01); *G02B 6/0016* (2013.01); *G02B 6/0036* (2013.01); *G02B 27/0093* (2013.01); *G02B 2027/0138* (2013.01)

(58) Field of Classification Search
CPC .................................................. G02B 27/0172
See application file for complete search history.

(56) References Cited

U.S. PATENT DOCUMENTS

8,929,589 B2 * 1/2015 Publicover ............. H04N 23/90
                                                      382/103
10,838,132 B1 * 11/2020 Calafiore ............. G02B 6/0015
11,106,033 B2    8/2021 Edwin et al.
(Continued)

*Primary Examiner* — Chun-Nan Lin
(74) *Attorney, Agent, or Firm* — Treyz Law Group, P.C.; Michael H. Lyons (57) ABSTRACT A display may include a waveguide. An input coupler may couple image light into the waveguide and an output coupler may couple the image light out of the waveguide. A surface relief grating on the waveguide may couple infrared light into the waveguide and may couple the infrared light out of the waveguide. The surface relief grating may additionally or alternatively couple reflected infrared light into the waveguide and out of the waveguide and towards an infrared sensor. The surface relief grating may also form a cross-coupler for the image light. The infrared sensor may gather infrared sensor data based on the reflected infrared light. Control circuitry may perform gaze tracking operations based on the infrared sensor data. The input and output couplers may also be formed from surface relief gratings or may include other optical components.

25 Claims, 6 Drawing Sheets (56) References Cited

U.S. PATENT DOCUMENTS

| | | |
|---|---|---|
| 11,474,358 B2 | 10/2022 | Meitav et al. |
| 2013/0077049 A1 | 3/2013 | Bohn |
| 2016/0085300 A1* | 3/2016 | Robbins .................. G06F 3/013 345/633 |
| 2018/0046859 A1 | 2/2018 | Jarvenpaa |
| 2019/0086674 A1 | 3/2019 | Sinay et al. |
| 2020/0333606 A1* | 10/2020 | Popovich .............. G06F 18/214 |
| 2022/0011578 A1 | 1/2022 | Sinay et al. |
| 2022/0035161 A1 | 2/2022 | Sinay et al. |
| 2022/0099977 A1 | 3/2022 | Meitav et al. |

* cited by examiner

WAVEGUIDE DISPLAY WITH GAZE TRACKING

This application claims priority to U.S. Provisional Patent Application No. 63/148,496, filed Feb. 11, 2021, which is hereby incorporated by reference herein in its entirety.

BACKGROUND

This relates generally to optical systems and, more particularly, to optical systems for displays.

Electronic devices may include displays that present images to a user's eyes. For example, devices such as virtual reality and augmented reality headsets may include displays with optical elements that allow users to view the displays.

It can be challenging to design devices such as these. If care is not taken, the components used in displaying content may be unsightly and bulky, can consume excessive power, and may not exhibit desired levels of optical performance.

SUMMARY

An electronic device such as a head-mounted device may have one or more near-eye displays that produce images for a user. The head-mounted device may be a pair of virtual reality glasses or may be an augmented reality headset that allows a viewer to view both computer-generated images and real-world objects in the viewer's surrounding environment.

The display may include a display module, an infrared emitter, an infrared sensor, and a waveguide. The display module may generate image light at visible wavelengths. The infrared emitter may emit infrared light. An input coupler may couple the image light into the waveguide. An output coupler may couple the image light out of the waveguide and towards an eye box. A surface relief grating on the waveguide may couple the infrared light into the waveguide. The surface relief grating may couple the infrared light out of the waveguide and towards an eye box after the infrared light coupled into the waveguide by the surface relief grating has reflected at least once off of a surface of the waveguide. The display may include a cross-coupler for the image light that is separate from the surface relief grating or the surface relief grating may also form a cross-coupler for the image light. The cross-coupler may redirect the image light towards the output coupler and may optionally expand the image light. The input coupler and output coupler may also be formed from surface relief gratings (e.g., in the same layer of grating medium as the surface relief grating for coupling the infrared light into and out of the waveguide). Alternatively, the input and output couplers may include prisms, partial reflectors, louvered mirrors, volume holograms, meta-gratings, thin film holograms, etc.

The surface relief grating may receive reflected infrared light from the eye box. The reflected infrared light may be a version of the infrared light coupled out of the waveguide by the surface relief grating that has reflected off of a portion of the user's eye at the eye box. The surface relief grating may couple the reflected infrared light into the waveguide. The surface relief grating may couple the reflected infrared light out of the waveguide and towards an infrared sensor after the reflected infrared light has reflected at least once off of the surface of the waveguide. The infrared sensor may generate infrared sensor data based on the reflected infrared light coupled out of the waveguide by the surface relief grating. Control circuitry may perform gaze tracking operations based on the infrared sensor data.

DETAILED DESCRIPTION

Figure 1:
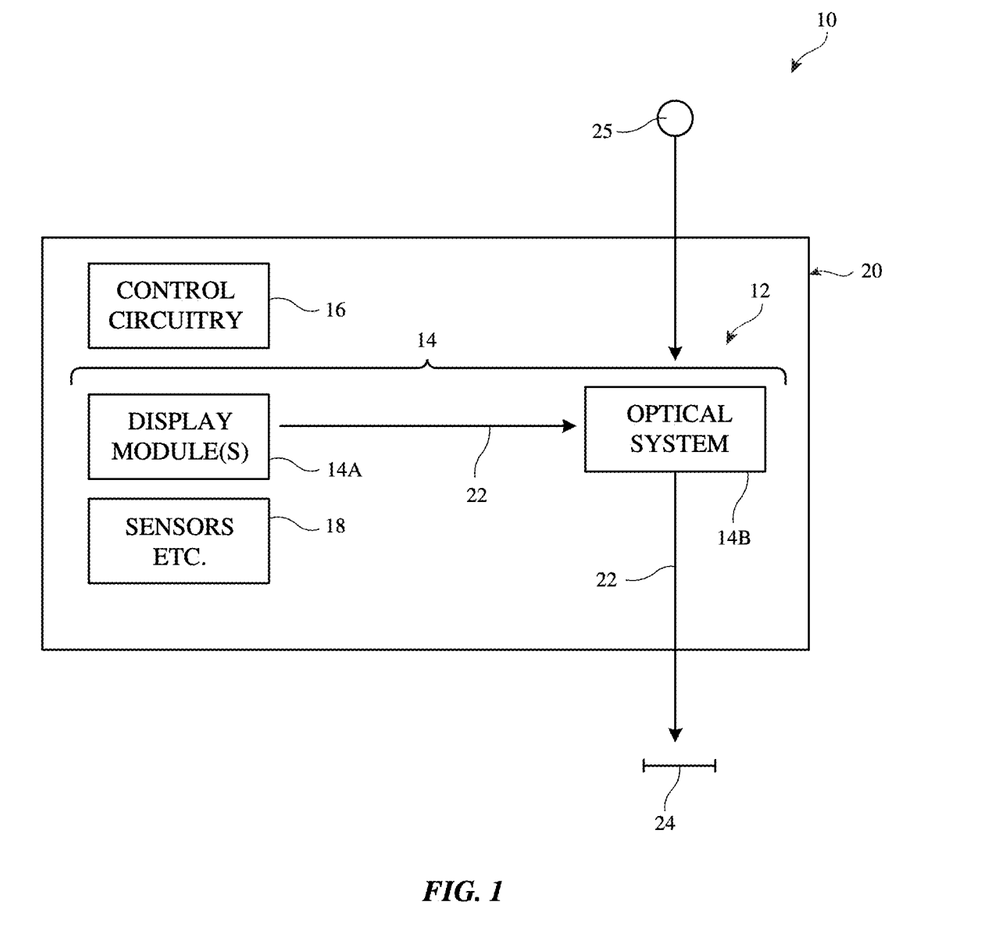
FIG. 1 is a diagram of an illustrative display system having display and gaze tracking capabilities in accordance with some embodiments.

An illustrative system having a device with one or more near-eye display systems is shown in FIG. 1. System 10 may be a head-mounted device having one or more displays such as near-eye displays 14 mounted within support structure (housing) 20. Support structure 20 may have the shape of a pair of eyeglasses (e.g., supporting frames), may form a housing having a helmet shape, or may have other configurations to help in mounting and securing the components of near-eye displays 14 on the head or near the eye of a user. Near-eye displays 14 may include one or more display modules such as display modules 14A and one or more optical systems such as optical systems 14B. Display modules 14A may be mounted in a support structure such as support structure 20. Each display module 14A may emit light 22 (sometimes referred to herein as image light 22) that is redirected towards a user's eyes at eye box 24 using an associated one of optical systems 14B. Image light 22 may be, for example, light that contains and/or represents something viewable such as a scene or object (e.g., as modulated onto the image light using the image data provided by the control circuitry to the display module).

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code (instructions) may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide system 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., world-facing cameras such as image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.). If desired, components 18 may include gaze tracking sensors that gather gaze image data from a user's eye at eye box 24 to track the direction of the user's gaze in real time. The gaze tracking sensors may include at least one infrared (IR) emitter that emits infrared or near-infrared light that is reflected off of portions of the user's eyes. At least one infrared image sensor may gather infrared image data from the reflected infrared or near-infrared light. Control circuitry 16 may process the gathered infrared image data to identify and track the direction of the user's gaze, for example.

Display modules 14A (sometimes referred to herein as display engines 14A, light engines 14A, or projectors 14A) may include reflective displays (e.g., displays with a light source that produces illumination light that reflects off of a reflective display panel to produce image light such as liquid crystal on silicon (LCOS) displays, ferroelectric liquid crystal on silicon (fLCOS) displays, digital-micromirror device (DMD) displays, or other spatial light modulators), emissive displays (e.g., micro-light-emitting diode (uLED) displays, organic light-emitting diode (OLED) displays, laser-based displays, etc.), or displays of other types. Light sources in display modules 14A may include uLEDs, OLEDs, LEDs, lasers, combinations of these, or any other desired light-emitting components.

Optical systems 14B may form lenses that allow a viewer (see, e.g., a viewer's eyes at eye box 24) to view images on display(s) 14. There may be two optical systems 14B (e.g., for forming left and right lenses) associated with respective left and right eyes of the user. A single display 14 may produce images for both eyes or a pair of displays 14 may be used to display images. In configurations with multiple displays (e.g., left and right eye displays), the focal length and positions of the lenses formed by components in optical system 14B may be selected so that any gap present between the displays will not be visible to a user (e.g., so that the images of the left and right displays overlap or merge seamlessly).

If desired, optical system 14B may contain components (e.g., an optical combiner, etc.) to allow real-world image light from real-world images or objects 25 to be combined optically with virtual (computer-generated) images such as virtual images in image light 22. In this type of system, which is sometimes referred to as an augmented reality system, a user of system 10 may view both real-world content and computer-generated content that is overlaid on top of the real-world content. Camera-based augmented reality systems may also be used in system 10 (e.g., in an arrangement in which a world-facing camera captures real-world images of object 25 and this content is digitally merged with virtual content at optical system 14B).

System 10 may, if desired, include wireless circuitry and/or other circuitry to support communications with a computer or other external equipment (e.g., a computer that supplies display 14 with image content). During operation, control circuitry 16 may supply image content to display 14. The content may be remotely received (e.g., from a computer or other content source coupled to system 10) and/or may be generated by control circuitry 16 (e.g., text, other computer-generated content, etc.). The content that is supplied to display 14 by control circuitry 16 may be viewed by a viewer at eye box 24.

Figure 2:
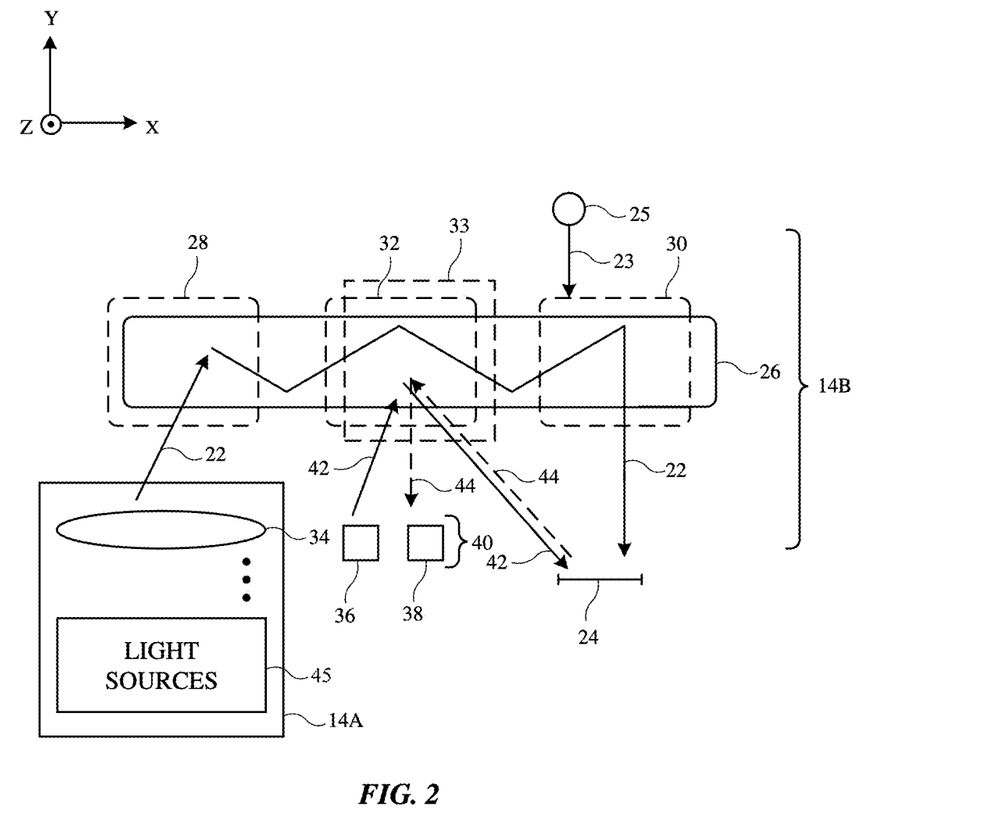
FIG. 2 is a top view of an illustrative optical system having a display module that provides image light to a waveguide and having an infrared emitter and an infrared sensor for performing gaze tracking in accordance with some embodiments.

FIG. 2 is a top view of an illustrative display 14 that may be used in system 10 of FIG. 1. As shown in FIG. 2, near-eye display 14 may include one or more display modules such as display module 14A and an optical system such as optical system 14B. Optical system 14B may include optical elements such as one or more waveguides 26. Waveguide 26 may include one or more stacked substrates (e.g., stacked planar and/or curved layers sometimes referred to herein as waveguide substrates) of optically transparent material such as plastic, polymer, glass, etc.

Display module 14A may include collimating optics 34. Collimating optics 34 may sometimes be referred to herein as eyepiece 34, collimating lens 34, optics 34, or lens 34. Collimating optics 34 may include one or more lens elements that help direct image light 22 towards waveguide 26. Collimating optics 34 may be omitted if desired. If desired, display module(s) 14A may be mounted within support structure 20 of FIG. 1 while optical system 14B may be mounted between portions of support structure 20 (e.g., to form a lens that aligns with eye box 24). Other mounting arrangements may be used, if desired.

As shown in FIG. 2, display module 14A may include light sources 45 for generating image light 22 associated with image content to be displayed to (at) eye box 24. If desired, display module 14A may include a spatial light modulator that modulates illumination light produced by light sources 45 (e.g., using image data) to produce image light 22 (e.g., image light that includes an image as identified by the image data). The spatial light modulator may be a reflective spatial light modulator (e.g., a DMD modulator, an LCOS modulator, an fLCOS modulator, etc.) or a transmissive spatial light modulator (e.g., an LCD modulator). In other implementations, display module 14A may include an emissive display panel such as an array of LEDs, OLEDs, uLEDs, lasers, or other light sources 45 instead of a spatial light modulator.

Image light 22 may be collimated using collimating optics 34. Optical system 14B may be used to present image light 22 output from display module 14A to eye box 24. Optical system 14B may include one or more optical couplers such as input coupler 28, cross-coupler 32, and output coupler 30. In the example of FIG. 2, input coupler 28, cross-coupler 32, and output coupler 30 are formed at or on waveguide 26. Input coupler 28, cross-coupler 32, and/or output coupler 30 may be completely embedded within the substrate layers of waveguide 26, may be partially embedded within the substrate layers of waveguide 26, may be mounted to waveguide 26 (e.g., mounted to an exterior surface of waveguide 26), etc. The example of FIG. 2 is merely illustrative. Optical system 14B may include multiple waveguides that are laterally and/or vertically stacked with respect to each other. Each waveguide may include one, two, all, or none of couplers 28, 32, and 30. Waveguide 26 may be at least partially curved or bent if desired.

Image light 22 includes light at visible wavelengths (e.g., between about 400 nm and 700 nm). Waveguide 26 may guide image light 22 down its length via total internal reflection. Input coupler 28 may be configured to couple image light 22 from display module 14A into waveguide 26, whereas output coupler 30 may be configured to couple image light 22 from within waveguide 26 to the exterior of waveguide 26 and towards eye box 24. As an example, display module 14A may emit image light 22 in the +Y direction towards optical system 14B. When image light 22 strikes input coupler 28, input coupler 28 may redirect image light 22 so that the light propagates within waveguide 26 via total internal reflection towards output coupler 30 (e.g., in the +X direction). When image light 22 strikes output coupler 30, output coupler 30 may redirect image light 22 out of waveguide 26 towards eye box 24 (e.g., back in the −Y direction).

In the example of FIG. 2, cross-coupler 32 is optically interposed between input coupler 28 and output coupler 30. In this example, input coupler 28 may redirect image light 22 towards cross-coupler 32 and cross-coupler 32 may redirect image light 22 towards output coupler 30. If desired, cross-coupler 32 may expand image light 22 in a first direction and may also couple (redirect) the expanded light back into waveguide 26. Waveguide 26 may propagate the light expanded by cross-coupler 32 via total internal reflection to output coupler 30. If desired, output coupler 30 may expand the image light 22 received from cross-coupler 32 in a second direction that is different from (e.g., perpendicular to) the first direction. Output coupler 30 may, if desired, provide an optical power to the light coupled out of the waveguide. Consider an example in which the image light 22 coupled into waveguide 26 by input coupler 28 includes a pupil of light. Expansion of image light 22 by cross-coupler 32 and output coupler 30 may serve to expand the pupil in multiple (e.g., orthogonal) dimensions, thereby allowing a relatively large eye box 24 to be filled with pupils of image light 22 with a sufficient and substantially uniform intensity across the entire area of the eye box.

In order to perform gaze tracking operations, optical system 14B may also include gaze tracking components 40. Gaze tracking components 40 may include an infrared light source such as infrared emitter 36 and an infrared image sensor such as infrared sensor 38. Infrared emitter 36 may emit infrared light 42. While referred to herein as infrared light 42, infrared light 42 may include light at infrared and/or near-infrared wavelengths (e.g., wavelengths from 700 nm up to 1000 microns). An example in which infrared light 42 includes light around 950 nm is sometimes described herein as an example. Infrared emitter 36 may include one or more infrared lasers, infrared LEDs, infrared OLEDs, infrared uLEDs, or any other desired infrared light source(s).

Waveguide 26 may include grating structures that couple infrared light 42 into waveguide 26 and that couple infrared light 42 out of waveguide 26 and towards eye box 24. In some implementations, these grating structures may form a part of cross-coupler 32. In other words, cross-coupler 32 may be a visible light cross-coupler that performs cross-coupling operations (e.g., redirection and optionally pupil expansion) on visible light such as the image light 22 that has been coupled into waveguide 26 by input coupler 28. At the same time, cross-coupler 32 may also serve as an infrared input coupler that couples infrared light 42 into waveguide 26. After one or more reflections off of a surface of waveguide 26 (e.g., within the total internal reflection (TIR) range of the waveguide), cross-coupler 32 may couple infrared light 42 out of waveguide 26 and towards eye box 24 (e.g., cross-coupler 32 may also serve as an infrared output coupler that couples infrared light 42 out of waveguide 26 and towards eye box 24). In these implementations, cross-coupler 32 may therefore sometimes be referred to herein as a visible light cross-coupler, as an infrared input coupler, as an infrared output coupler, as a visible light cross-coupler and infrared input coupler, as a visible light cross-coupler and infrared output coupler, or as a combined visible light cross-coupler and infrared input/output coupler (e.g., visible light cross-coupler and infrared input/output coupler 32).

In other implementations, waveguide 26 may include a dedicated grating structure 33 for redirecting infrared light 42. Grating structure 33 may therefore sometimes be referred to herein as infrared grating structure 33. Infrared grating structure 33 is separate from cross-coupler 32 and therefore does not operate on image light 22. Infrared grating structure 33 may couple infrared light 42 into waveguide 26. After one or more reflections off of a surface of waveguide 26 (e.g., within the total internal reflection (TIR) range of the waveguide), infrared grating structure 33 may couple infrared light 42 out of waveguide 26 and towards eye box 24. Infrared grating structure 33 may therefore sometimes be referred to herein as infrared input coupler 33, infrared output coupler 33, combined infrared input coupler and infrared output coupler 33, or simply as infrared input/output coupler 33.

The infrared light 42 that has been coupled out of waveguide 26 (e.g., by cross-coupler 32 or infrared input/output coupler 33) may reflect off of portions of the user's eye at eye box 24 as reflected infrared light 44. While referred to herein as reflected infrared light 44, reflected infrared light 44 may include light at infrared and/or near-infrared wavelengths (e.g., the same wavelengths as infrared light 42). The same grating structures used to convey infrared light 42 from infrared emitter 36 to eye box 24 may also be used to convey reflected infrared light 44 from eye box 24 to infrared sensor 38. For example, cross-coupler 32 or infrared input/output coupler 33 may couple reflected infrared light 44 into waveguide 26 and may couple reflected infrared light 44 (e.g., after one or more reflections off of a surface of waveguide 26) out of waveguide 26 and towards infrared sensor 38.

Infrared sensor 38 may gather infrared image sensor data (e.g., gaze tracking data). Control circuitry 16 (FIG. 1) may process the gathered infrared image sensor data to identify and/or track the direction of the user's gaze at eye box 24 over time. If desired, control circuitry 16 may update the image data conveyed by image light 22 or may perform other operations based on the identified direction of the user's gaze. This example is merely illustrative and, if desired, waveguide 26 may include an additional infrared grating structure that is separate from cross-coupler 32 and infrared input/output coupler 33 for redirecting reflected infrared light 44 from eye box 24 towards infrared sensor 38.

Input coupler 28, cross-coupler 32, infrared input/output coupler 33, and output coupler 30 may be based on reflective and refractive optics or may be based on holographic (e.g., diffractive) optics. In arrangements where optical couplers 28, 30, 32, or 33 are formed from reflective and refractive optics, the coupler may include one or more reflectors (e.g., an array of micromirrors, partial mirrors, louvered mirrors, or other reflectors). In arrangements where couplers 28, 30, 32, or 33 are based on holographic optics, the coupler may include diffractive gratings (e.g., volume holograms, surface relief gratings, etc.). The diffractive gratings may include holographic recordings (e.g., holographic phase gratings sometimes referred to herein as holograms) formed (stored) in holographic media such as photopolymers, gelatin such as dichromated gelatin, silver halides, holographic polymer dispersed liquid crystal, or other suitable holographic media. The holographic media may sometimes be referred to herein as grating media.

A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of grating medium if desired. The holographic phase gratings may be, for example, volume holograms in the grating medium. Thin film holograms or other types of holograms may also be used.

If desired, one or more of couplers 28, 30, 32, and 33 may be implemented using other types of diffraction grating structures such as surface relief grating (SRG) structures. Surface relief grating structures include diffraction gratings (e.g., surface relief gratings) that are mechanically cut, etched, or otherwise formed in a surface relief grating medium. The surface relief gratings diffract light that is incident upon the surface relief gratings. Rather than modulating index of refraction in the grating medium (as performed to create holographic phase gratings such as volume holograms), surface relief gratings are produced by varying the physical thickness of the medium across its lateral area. Multiple surface relief gratings (e.g., two surface relief gratings) may be multiplexed within the same volume of surface relief grating medium if desired.

Any desired combination of diffractive, reflective, and refractive optics may be used to form couplers 28, 30, 32, and 33 (e.g., diffractive gratings such as surface relief gratings, volume holograms, thin film holograms, meta-gratings, or other diffractive gratings, reflective optics such as partial reflectors, louvered mirrors, or other reflective structures, and refractive optics such as prisms or lenses may be used to form any desired combination of couplers 28, 30, 32, and 33). In some implementations that are described herein as an example, input coupler 28, cross-coupler 32, infrared input/output coupler 33 (e.g., in embodiments where waveguide 26 includes infrared input/output coupler 33), and output coupler 30 are all formed from surface relief gratings on one or more waveguide substrates in waveguide 26. If desired, the surface relief gratings used to form each of these optical couplers may be formed in the same layer of surface relief grating medium.

In other implementations that are described herein as an example, cross-coupler 32 includes a surface relief grating structure, infrared input/output coupler 33 is omitted, input coupler 28 is formed from a transmissive or reflective input coupling prism, partial reflector, louvered mirror, or volume holographic grating structure, and output coupler 30 is formed from a partial reflector, louvered mirror, or volume holographic grating structure. These examples are merely illustrative and, in general, any desired combination of surface relief grating structures, reflective optics, refractive optics, volume holographic grating structures, or other holographic grating structures may be used to form any desired combination of the optical couplers on waveguide 26.

Figure 3:
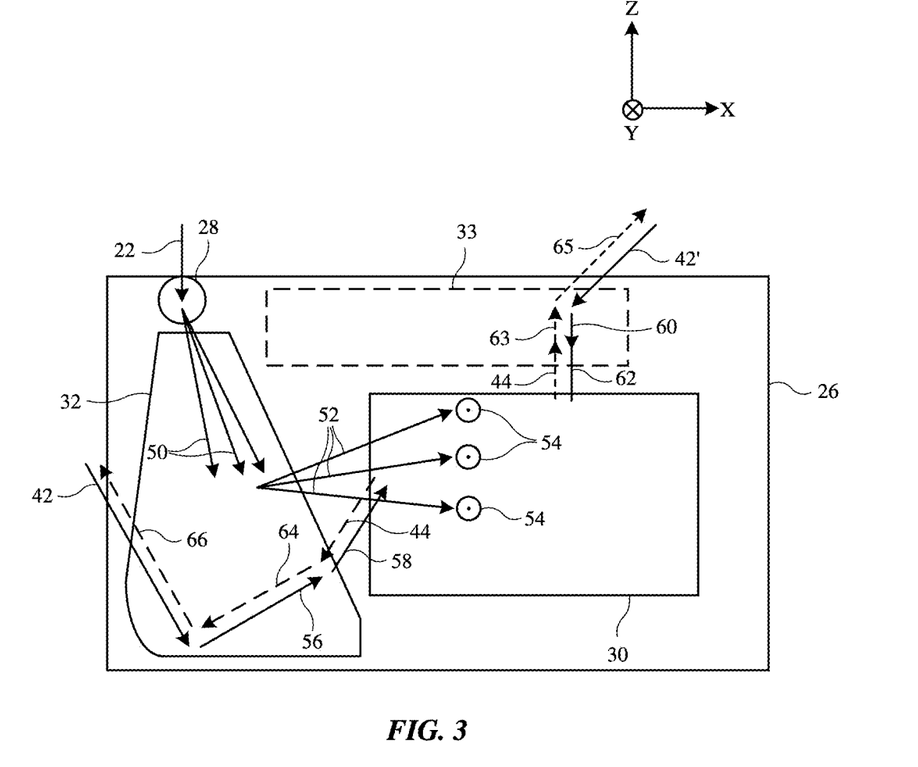
FIG. 3 is a front view of an illustrative waveguide having a visible light input coupler, a visible light cross coupler, a visible light output coupler, and grating structures that perform infrared input coupling and infrared output coupling for gaze tracking in accordance with some embodiments.

FIG. 3 is a front view showing how waveguide 26 may be used to redirect both image light 22 and infrared light 42. As shown in FIG. 3, input coupler 28 may couple image light 22 into waveguide 26 and towards cross-coupler 32, as shown by arrows 50. Cross-coupler 32 may redirect visible light such as image light 22 incident from input coupler 28 towards output coupler 30, as shown by arrows 52 (e.g., cross-coupler 32 may be configured to diffract light at visible wavelengths and at incident angles corresponding to arrows 50 onto output angles that lie within the TIR range of waveguide 26 and that correspond to arrows 52). Cross-coupler 32 may optionally expand image light 22 in one or more directions. Output coupler 30 may couple image light 22 out of waveguide 26 and towards the eye box, as shown by arrows 54 (e.g., output coupler 30 may be configured to diffract light at visible wavelengths and at incident angles corresponding to arrows 52 onto output angles that lie outside of the TIR range of waveguide 26 and that correspond to arrows 54). In this way, a user may view images in image light 22 at the eye box.

At the same time, infrared light 42 may be incident upon cross-coupler 32 from infrared emitter 36 of FIG. 2 (e.g., input coupler 28 may couple image light 22 but not infrared light 42 into waveguide 26). Cross-coupler 32 may couple infrared light 42 into waveguide 26 and towards the eye box, as shown by arrow 56 (e.g., cross-coupler 32 may be configured to diffract light at infrared wavelengths and at incident angles from infrared emitter 36 onto output angles within waveguide 26 and that correspond to arrow 56). After one or more reflections off of the surfaces of waveguide 26, cross-coupler 32 may couple infrared light 42 out of waveguide 26 and towards the eye box, as shown by arrow 58 (e.g., cross-coupler 32 may be configured to diffract light at infrared wavelengths and at incident angles within waveguide 26 onto output angles that lie outside the TIR range of waveguide 26 and that correspond to arrow 58). While arrow 58 is shown in the plane of the page of FIG. 3 for the sake of clarity, arrow 58 also has a non-zero component in the −Y direction.

The infrared light 42 coupled out of waveguide 26 by cross-coupler 32 may reflect off of portions of the user's eye at the eye box (e.g., the user's iris, pupil, etc.) as reflected infrared light 44. Cross-coupler 32 may couple reflected infrared light 44 into waveguide 26 and towards the infrared sensor, as shown by arrow 64 (e.g., cross-coupler 32 may be configured to diffract light at infrared wavelengths and at incident angles from the eye box onto output angles that lie within waveguide 26 and that correspond to arrow 64). After one or more reflections off of the surfaces of waveguide 26, cross-coupler 32 may couple reflected infrared light 44 out of waveguide 26 and towards infrared sensor 38 (FIG. 2), as shown by arrow 66 (e.g., cross-coupler 32 may be configured to diffract light at infrared wavelengths and at incident angles within waveguide 26 onto output angles that lie outside the TIR range of waveguide 26 and that correspond to arrow 66). While arrow 66 is shown in the plane of the page of FIG. 3 for the sake of clarity, arrow 66 may also have a non-zero component in the −Y direction. In this way, the same diffractive grating structure (e.g., the same surface relief grating) that is used to perform cross-coupling and optionally pupil expansion for image light 22 may also perform infrared input and output coupling for use in gaze tracking operations.

This example is merely illustrative. In examples where waveguide 26 includes infrared input/output coupler 33, infrared light 42 may be incident upon infrared input/output coupler 33 from infrared emitter 36 of FIG. 2. Infrared input/output coupler 33 may couple infrared light 42 into waveguide 26 and towards the eye box, as shown by arrow 60 (e.g., cross-coupler 32 may be configured to diffract light at infrared wavelengths and at incident angles from infrared emitter 36 onto output angles that lie within the TIR range of waveguide 26 and that correspond to arrow 60). After one or more reflections off of the surfaces of waveguide 26, infrared input/output coupler 33 may couple infrared light 42 out of waveguide 26 and towards the eye box, as shown by arrow 62 (e.g., infrared input/output coupler 33 may be configured to diffract light at infrared wavelengths and at incident angles lying within waveguide 26 onto output angles that lie outside the TIR range of waveguide 26 and that correspond to arrow 62). While arrow 62 is shown in the plane of the page of FIG. 3 for the sake of clarity, arrow 62 also has a non-zero component in the −Y direction.

The infrared light 42 coupled out of waveguide 26 by infrared input/output coupler 33 may reflect off of the user's eye at the eye box as reflected infrared light 44. Infrared input/output coupler 33 may couple reflected infrared light 44 into waveguide 26 and towards the infrared sensor, as shown by arrow 63 (e.g., infrared input/output coupler 33 may be configured to diffract light at infrared wavelengths and at incident angles from the eye box onto output angles within waveguide 26 and that correspond to arrow 63). After one or more reflections off of the surfaces of waveguide 26, infrared input/output coupler 33 may couple reflected infrared light 44 out of waveguide 26 and towards infrared sensor 38 (FIG. 2), as shown by arrow 65 (e.g., infrared input/output coupler 33 may be configured to diffract light at infrared wavelengths and at incident angles lying within waveguide 26 onto output angles that lie outside the TIR range of waveguide 26 and that correspond to arrow 65). While arrow 65 is shown in the plane of the page of FIG. 3 for the sake of clarity, arrow 65 may also have a non-zero component in the −Y direction.

The example of FIG. 3 is merely illustrative. Input coupler 28, cross-coupler 32, output coupler 30, and infrared input/output coupler 33 may have other relative positions, shapes, and sizes. Infrared light 42 may be incident upon cross-coupler 32 or infrared input/output coupler 33 at other angles.

Figure 4:
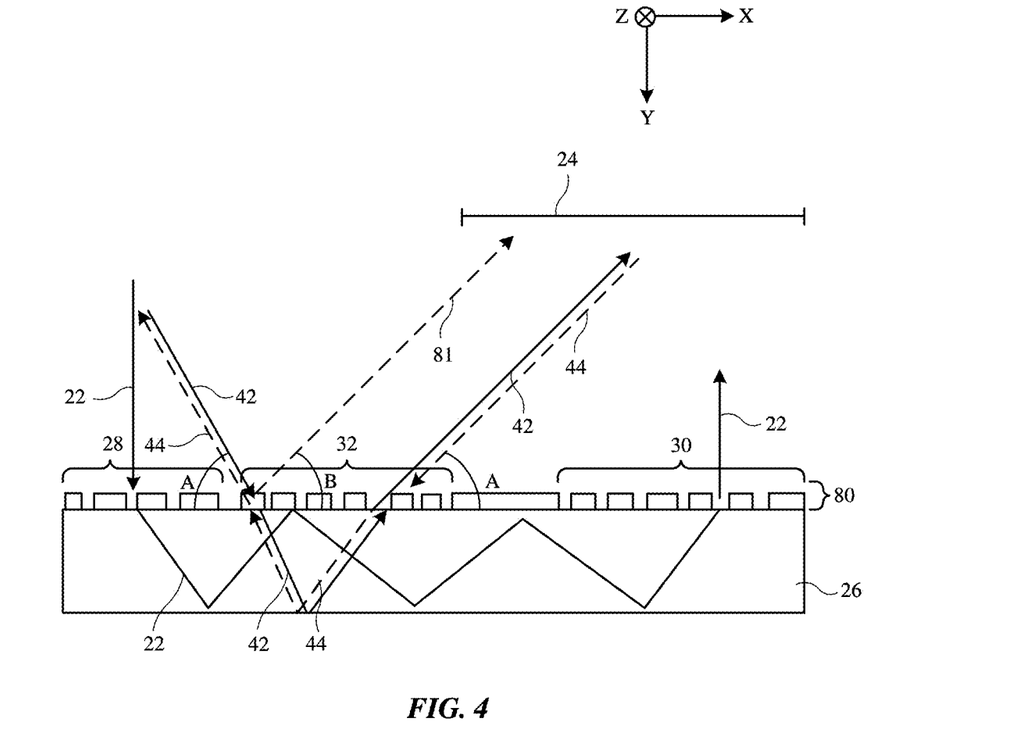
FIG. 4 is a cross sectional bottom view of an illustrative waveguide having surface relief gratings that form a visible light input coupler, a visible light cross coupler, a visible light output coupler, an infrared input coupler, and an infrared output coupler in accordance with some embodiments.

In some implementations, infrared input/output coupler 33 is omitted and input coupler 28, cross-coupler 32, and output coupler 30 are all formed from surface relief grating structures. FIG. 4 is a cross-sectional bottom view showing one example of how input coupler 28, cross-coupler 32, and output coupler 30 may all be formed from surface relief grating structures. As shown in FIG. 4, a layer of grating medium such as surface relief grating medium 80 may be layered onto a lateral surface of waveguide 26. Input coupler 28 may include a first surface relief grating structure (e.g., a first surface relief grating) formed in a first portion (region) of surface relief grating medium 80, cross-coupler 32 may include a second surface relief grating structure (e.g., a second surface relief grating) formed in a second portion (region) of surface relief grating medium 80, and output coupler 30 may include a third surface relief grating structure (e.g., a third surface relief grating) formed in a third portion (region) of surface relief grating medium 80 (e.g., the second surface relief grating structure and cross-coupler 32 may be optically interposed between input coupler 28 and output coupler 30). The first surface relief grating structure (for input coupler 28) may be formed from a first set of thickness modulations having first orientations in surface relief grating medium 80. The second surface relief grating structure (for cross-coupler 32) may be formed from a second set of thickness modulations having second orientations in surface relief grating medium 80. The third surface relief grating structure (For output coupler 30) may be formed from a third set of thickness modulations having third orientations in surface relief grating medium 80.

As shown in FIG. 4, the first surface relief grating structure in input coupler 28 may couple image light 22 into waveguide 26 (e.g., at output angles lying within the TIR range of waveguide 26). Image light 22 may thereby propagate down the length of waveguide 26 via total internal reflection. Once image light 22 hits the second surface relief grating structure in cross-coupler 32, cross-coupler 32 may redirect image light 22 towards output coupler 30 (e.g., as shown by arrows 52 of FIG. 3) and may optionally perform pupil expansion for image light 22. Cross-coupler 32 may redirect image light 22 by diffracting the image light onto output angles that also lie within the TIR range of waveguide 26). Image light 22 may thereby propagate further down the length of waveguide 26 via total internal reflection. Once image light 22 hits the third surface relief grating structure in output coupler 30, output coupler 30 may redirect image light 22 incident within the TIR range of waveguide 26 out of the waveguide and towards eye box 24 (e.g., as shown by arrows 54 of FIG. 3).

The second surface relief grating structure in cross-coupler 32 may also couple infrared light 42 into waveguide 26 (e.g., at output angles lying within waveguide 26 and that are generally in the direction of the eye box). Infrared light 42 may thereby propagate down the length of waveguide 26 (e.g., as shown by arrow 56 of FIG. 3). Once infrared light 42 reflects off of the surface of waveguide 26 opposite surface relief grating medium 80, infrared light 42 will then be incident upon cross-coupler 32 from within waveguide 26. Once infrared light 42 hits the second surface relief grating structure in cross-coupler 32 from within waveguide 26, cross-coupler 32 may couple infrared light 42 out of waveguide 26 and towards eye box 24 (e.g., at output angles lying outside the TIR range of waveguide 26 and that are in the direction of eye box 24). Cross-coupler 32 may couple infrared light 42 that is incident at angle A with respect to the lateral surface of waveguide 26 into waveguide 26. Cross-coupler 32 may also couple infrared light 42 out of waveguide 26 and towards eye box 24 at angle A with respect to the lateral surface of waveguide 26 or at an angle different than angle A.

Conversely, the second surface relief grating structure in cross-coupler 32 may also couple reflected infrared light 44 into waveguide 26 (e.g., cross-coupler 32 may diffract reflected infrared light 44 incident at angle A onto output angles lying within waveguide 26 and that are generally in the direction of the infrared sensor). Reflected infrared light 44 may thereby propagate down the length of waveguide 26 (e.g., as shown by arrow 64 of FIG. 3). Once reflected infrared light 44 reflects off of the surface of waveguide 26 opposite surface relief grating medium 80, reflected infrared light 44 will then be incident upon cross-coupler 32 from within waveguide 26. Once reflected infrared light 44 hits the second surface relief grating structure in cross-coupler 32 from within waveguide 26, cross-coupler 32 may couple reflected infrared light 44 out of waveguide 26 and towards the infrared sensor (e.g., cross-coupler 32 may diffract reflected infrared light 44 onto angle A, which lies outside the TIR range of waveguide 26 and which is in the direction of infrared sensor 38 of FIG. 2). In this way, the second surface relief grating structure may serve as a visible light cross-coupler for image light 22, as an input coupler for infrared light 42, as an output coupler for infrared light 42, as an input coupler for reflected infrared light 44, and as an output coupler for reflected infrared light 44.

The example of FIG. 4 is merely illustrative. If desired, cross-coupler 32 may direct infrared light 42 to eye box 24 without coupling infrared light 42 into the waveguide, as shown by arrow 81 (e.g., cross-coupler 32 may diffract infrared light 42 incident at angle A onto an output angle B in the direction of eye box 24). Because infrared light 42 does not propagate through waveguide 26 in this embodiment, the overall optical efficiency for infrared light 42 may be greater than in scenarios where cross-coupler 32 couples infrared light 42 into waveguide 26. Similarly, cross-coupler 32 may redirect reflected infrared light 44 from eye box 24 towards the infrared image sensor without coupling the reflected infrared light into waveguide 26 if desired (e.g., cross-coupler 32 may diffract reflected infrared light 44 incident at a given angle C onto a given output angle D in the direction of the infrared image sensor).

If desired, input coupler 28 may be formed from a reflective or transmissive input coupling prism, louvered mirrors, volume holograms, surface relief gratings formed from a layer of surface relief grating medium other than surface relief grating medium 80, other diffractive grating structures, other refractive optics, and/or other reflective optics. Similarly, if desired, output coupler 30 may be formed from louvered mirrors, volume holograms, surface relief gratings formed from a layer of surface relief grating medium other than surface relief grating medium 80, other diffractive grating structures, other refractive optics, and/or other reflective optics. In scenarios where waveguide 26 includes infrared input/output coupler 33 of FIGS. 2 and 3, infrared input/output coupler 33 may be formed from a fourth surface relief grating structure in a fourth portion (region) of surface relief grating medium 80. If desired, in scenarios where waveguide 26 includes infrared input/output coupler 33, cross-coupler 32 may be formed from other diffractive, reflective, and/or refractive optics for redirecting image light 22 (e.g., volume holograms, thin film holograms, meta-gratings, partial reflectors, louvered mirrors, etc.).

Waveguide 26 is illustrated as including a single waveguide substrate in the example of FIG. 4 for the sake of clarity. In general, waveguide 26 may include two or more stacked layers of waveguide substrate. In examples where input coupler 28 and/or output coupler 30 include volume holograms, the volume holograms may be recorded in a grating medium that is layered onto a surface of waveguide 26 or that is sandwiched between two or more layers of waveguide substrate. Surface relief grating medium 80 may be interposed between two layers of waveguide substrate if desired (e.g., waveguide 26 may include an additional waveguide substrate layered over surface relief grating medium 80 of FIG. 4). Input coupler 28, cross-coupler 32, and output coupler 30 may be distributed across multiple layers of surface relief grating medium interspersed on or between one or more layers of waveguide substrate. One or more surfaces of waveguide 26 may be curved if desired.

Figure 5:
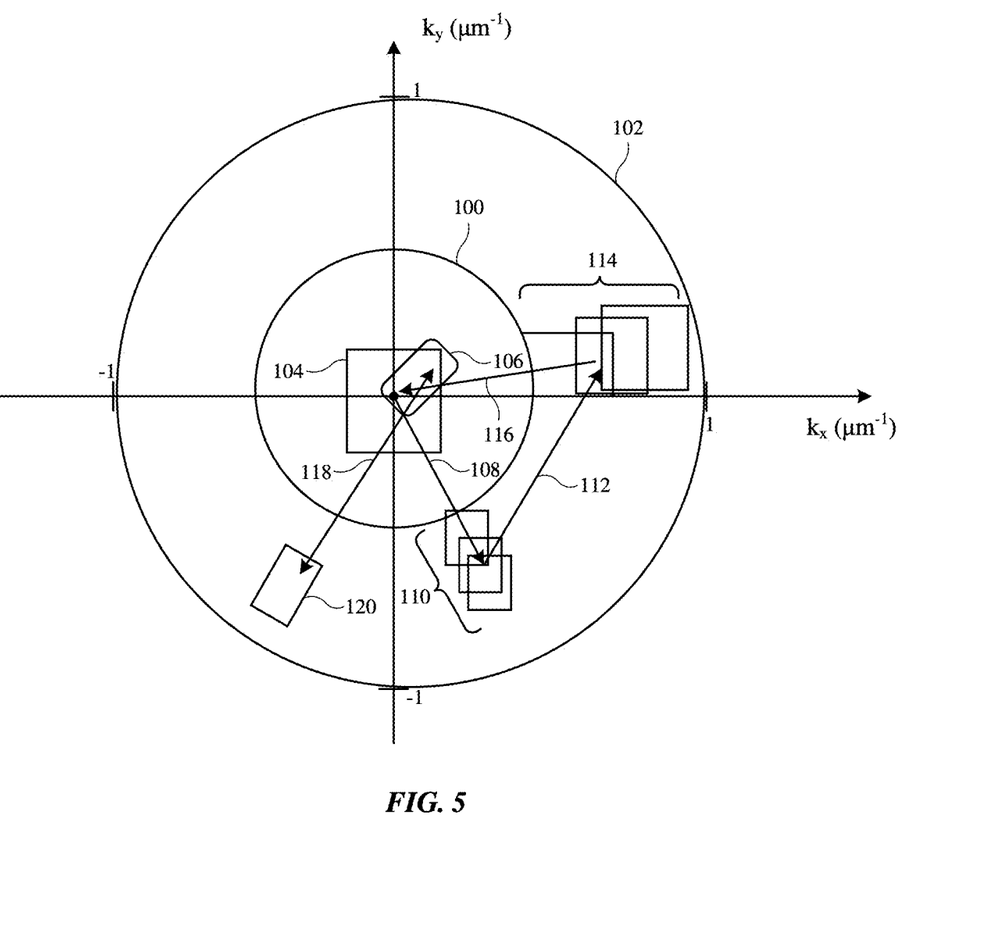
FIG. 5 is a two-dimensional k-space diagram showing how an illustrative visible light cross-coupler may also perform infrared input coupling and infrared output coupling for gaze tracking in accordance with some embodiments.

FIG. 5 is a k-space (momentum space) diagram showing how the same surface relief grating structure (e.g., a surface relief grating used to form cross-coupler 32) may be used to perform cross-coupling for image light 22 as well as input/output coupling for infrared light 42 and reflected infrared light 44. The k-space diagram of FIG. 5 is a two-dimensional projection of three-dimensional k-space (e.g., in the X-Y plane). The horizontal axis of FIG. 5 plots $k_x$ in units of $\mu m^{-1}$ and the vertical axis of FIG. 5 plots $k_y$ in units of $\mu m^{-1}$, where $k_x$ represents the X component and $k_y$ represents the Y component of the k-vector (momentum vector) for light propagating through optical system 14B.

Region 104 represents the field of view from output coupler 30 (e.g., as provided at eye box 24). Region 110 represents the image light 22 that is coupled into waveguide 50 by input coupler 28 (e.g., by the first surface relief grating structure of FIG. 4). Region 114 represents the image light 22 that is redirected by cross-coupler 32 (e.g., by the second surface relief grating structure of FIG. 4). Regions 110 and 114 of FIG. 5 each include three sub-regions, each corresponding to a respective wavelength range emitted by light sources 45 of FIG. 2 (e.g., red, green, and blue wavelength ranges). The region between circles 100 and 102 represents the region in k-space within which waveguide 26 supports total internal reflection.

The diffraction operation performed by input coupler 28 is schematically represented by arrow 108. Arrow 108 characterizes the grating vector of input coupler 28 (e.g., arrow 108 may be the grating vector of input coupler 28, where the orientation of the grating vector describes the grating direction and the length of the grating vector describes the grating frequency of the input coupler). The diffraction operation performed by cross-coupler 32 on image light 22 is schematically represented by arrow 112. Arrow 112 characterizes the grating vector of cross-coupler 32 (e.g., the diffraction operation on image light 22 involves diffraction of incident light at points within region 110 onto corresponding points within region 114, as determined from the vector addition of arrow 112 with each of the points in region 110). The diffraction operation performed by output coupler 30 on image light 22 is schematically represented by arrow 116. Arrow 116 characterizes the grating vector of output coupler 30. This diffraction produces image light 22 that is output within the field of view of eye box 24 (region 104) for view by the user.

Region 106 of FIG. 5 represents the portion of the field of view of eye box 24 that is to be illuminated using infrared light 42. Region 106 is smaller than region 104. Region 106 may, for example, correspond to a portion of the field of view of eye box 24 required to satisfactorily illuminate the user's pupil, iris, or other physiological features of the user's eye. The diffraction operation performed on infrared light 42 by cross-coupler 32 is schematically represented by arrow 118. Arrow 118 characterizes the grating vector of cross-coupler 32. Arrow 118 therefore has the same length and orientation as arrow 112 (e.g., because the same surface relief grating having a given grating vector as characterized by arrows 118 and 112 is used to diffract both image light 22 and infrared light 42). In order to provide the infrared light to region 106 within eye box 24, infrared light 42 needs to be incident upon cross-coupler 32 within region 120 (e.g., such that the vector addition of arrow 118 with each of the points within region 120 recovers corresponding points within region 106). Because region 106 is much smaller than region 104, cross-coupler 32 may thereby diffract both image light 22 (e.g., for cross-coupling and pupil expansion within waveguide 26) and may also diffract infrared light 42 (e.g., for coupling the infrared light into and out of the waveguide). Cross-coupler 32 may operate similarly for directing reflected infrared light 44 from within region 106 onto region 120 for providing the reflected infrared light to the infrared sensor.

Figure 6:
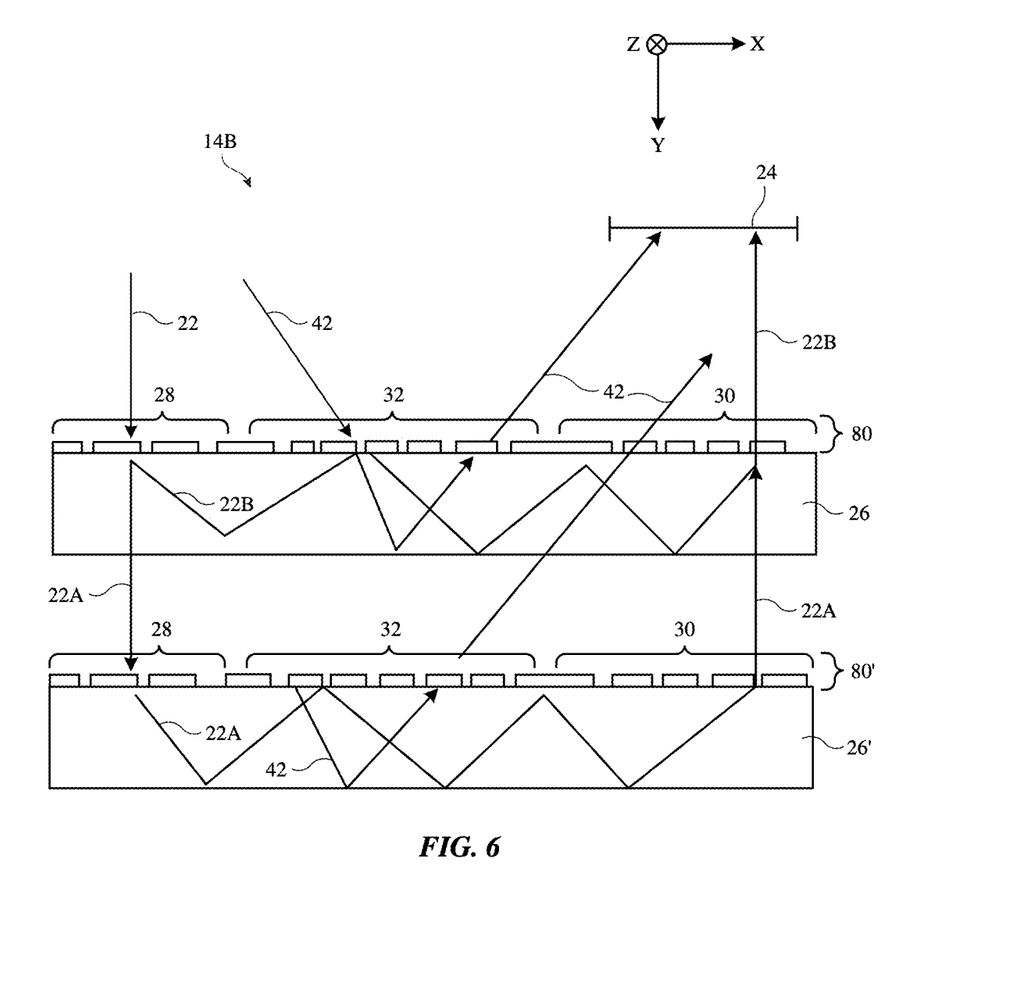
FIG. 6 is a cross sectional bottom view showing how multiple waveguides may be used to redirect image light and infrared light towards an eye box in accordance with some embodiments.

The example of FIG. 4 in which only a single waveguide 26 is used to direct infrared light 42, image light 22, and reflected infrared light 44 is merely illustrative. If desired, optical system 14B may include a pair of waveguides for directing infrared light 42, image light 22, and reflected infrared light 44. FIG. 6 is a cross sectional bottom view of optical system 14B in one implementation in which optical system 14B includes a pair of stacked waveguides for directing infrared light 42, image light 22, and reflected infrared light 44.

As shown in FIG. 6, optical system 14B may include an additional waveguide 26' stacked under waveguide 26. Waveguides 26 and 26' may be mounted together (e.g., using optically clear adhesive) or may be spaced apart. Additional waveguide 26' may include a corresponding input coupler 28, cross-coupler 32, and output coupler 30. Additional waveguide 26' may include a layer of surface relief grating medium 80' that is used to form surface relief gratings for input coupler 28, cross-coupler 32, and output coupler 30. Two or more layers of surface relief grating medium may be used on additional waveguide 26' if desired.

Image light 22 may be incident upon input coupler 28 of waveguide 26. The input coupler 28, cross-coupler 32, and output coupler 30 on waveguide 26 may be configured to diffract a first set of one or more wavelength bands (e.g., color channels) in image light 22. The wavelengths of image light 22 that are not diffracted by the input coupler 28 on waveguide 26 may be transmitted to the input coupler 28 on additional waveguide 26'. The input coupler 28, cross-coupler 32, and output coupler 30 on additional waveguide 26' may be configured to diffract a second set of one or more wavelength bands (e.g., color channels) in image light 22 (e.g., the wavelengths of image light 22 that are not diffracted by the input coupler 28 on waveguide 26). Dividing wavelengths between waveguides may, for example, serve to maximize the diffraction efficiency of the surface relief gratings on each of the waveguides (e.g., because each surface relief grating is optimized to diffract only a subset of the visible/infrared spectrum).

The cross-coupler 32 on waveguide 26 and the cross-coupler 32 on additional waveguide 26' may both be configured to couple infrared light 42 into the corresponding waveguide and out of the corresponding waveguide towards eye box 24. For example, the infrared light 42 that is not diffracted by cross-coupler 32 on waveguide 26 may pass to the cross-coupler 32 on additional waveguide 26', which then redirects that remaining infrared light 42 towards eye box 24. Alternatively, separate infrared light sources 36 may be used to illuminate waveguides 26 and 26', respectively. In other implementations, cross-couplers 32 may diffract incident infrared light 42 towards eye box 24 without coupling the infrared light into the corresponding waveguide (e.g., as shown by arrow 81 of FIG. 4). FIG. 6 only shows the diffraction of infrared light 42 by cross-couplers 32 for the sake of clarity. The cross-coupler 32 on waveguide 26 and the cross-coupler 32 on additional waveguide 26' may also direct reflected infrared light 44 (FIG. 4) towards infrared sensor 38.

The cross-coupler(s) 32 in optical system 14B (e.g., the cross coupler 32 on waveguide 26 and optionally the cross coupler 32 on additional waveguide 26') may be linear surface relief gratings or two-dimensional surface relief gratings (e.g., within the X-Z plane of FIG. 6). In examples where cross-coupler 32 is a two-dimensional surface relief grating, the surface relief gratings (e.g., the grooves or notches in the corresponding surface relief grating medium) may include a set of repeating unit cells (e.g., when viewed in the X-Z plane). Each unit cell may have a hexagonal shape, a rectangular shape, a square shape, or any other desired shape (e.g., where the unit cells are arranged in a two-dimensional lattice).

In accordance with another embodiment, a display system is provided that includes a waveguide configured to direct image light; a light source configured to generate infrared light; a surface relief grating on the waveguide, the surface relief grating is configured to diffract the infrared light; and control circuitry configured to perform gaze tracking operations based at least in part on the infrared light diffracted by the surface relief grating.

In accordance with another embodiment, the display system includes an input coupler on the waveguide and configured to couple the image light into the waveguide, the surface relief grating is configured to diffract the image light coupled into the waveguide by the input coupler.

In accordance with another embodiment, the display system includes an output coupler on the waveguide and configured to couple the image light out of the waveguide, the surface relief grating being configured to redirect the image light towards the output coupler.

In accordance with another embodiment, the input coupler includes an input coupling prism.

In accordance with another embodiment, the output coupler includes a set of volume holograms.

In accordance with another embodiment, the output coupler includes a louvered mirror.

In accordance with another embodiment, the input coupler includes a set of volume holograms.

In accordance with another embodiment, the input coupler includes a first additional surface relief grating and the output coupler includes a second additional surface relief grating.

In accordance with an embodiment, the display system is provided that includes a surface relief grating medium layered onto the waveguide, the surface relief grating, the first additional surface relief grating, and the second additional surface relief grating are formed in the surface relief grating medium.

In accordance with another embodiment, the surface relief grating is configured to couple the infrared light into the waveguide, the infrared light coupled into the waveguide is configured to reflect off of a surface of the waveguide, and the surface relief grating is configured to couple, out of the waveguide, the infrared light that has reflected off of the surface of the waveguide.

In accordance with another embodiment, the surface relief grating is configured to couple the infrared light into the waveguide, the infrared light coupled into the waveguide is configured to reflect off of a surface of the waveguide, and the surface relief grating is configured to couple, out of the waveguide, the infrared light that has reflected off of the surface of the waveguide.

In accordance with another embodiment, the display system includes a sensor, the surface relief grating is configured to receive reflected infrared light, the surface relief grating is configured to couple the reflected infrared light into the waveguide, the reflected infrared light is configured to reflect off of the surface of the waveguide, the surface relief grating is configured to couple, out of the waveguide and towards the sensor, the reflected infrared light that has reflected off of the surface of the waveguide, the sensor is configured to generate sensor data based on the reflected infrared light coupled out of the waveguide by the surface relief grating, and the control circuitry is configured to perform the gaze tracking operations based at least in part on the sensor data.

In accordance with another embodiment, the display system includes an input coupler on the waveguide and configured to couple the image light into the waveguide; an output coupler on the waveguide and configured to couple the image light out of the waveguide; and a cross-coupler on the waveguide that is separate from the surface relief grating, the cross-coupler is configured to redirect, towards the output coupler, the image light coupled into the waveguide by the input coupler.

In accordance with an embodiment, a display system is provided that includes a waveguide configured to direct image light; a surface relief grating structure on the waveguide, the surface relief grating structure is configured to: receive reflected infrared light, couple the reflected infrared light into the waveguide, and couple the reflected infrared light out of the waveguide after the reflected infrared light has reflected at least once off of a surface of the waveguide; an image sensor configured to generate image sensor data based on the reflected infrared light coupled out of the waveguide by the surface relief grating structure; and control circuitry configured to perform gaze tracking operations based at least in part on the image sensor data.

In accordance with another embodiment, the display system includes an input coupler configured to couple the image light into the waveguide; and an output coupler configured to couple the image light out of the waveguide, the surface relief grating structure is configured to redirect, towards the output coupler, the image light coupled into the waveguide by the input coupler.

In accordance with another embodiment, the surface relief grating structure is configured to expand the image light in at least one direction.

In accordance with another embodiment, the display system includes a layer of surface relief grating medium on the waveguide, the surface relief grating structure is formed in the layer of surface relief grating medium and the output coupler includes an additional surface relief grating structure formed in the layer of surface relief grating medium.

In accordance with another embodiment, the display system includes a layer of surface relief grating medium on the waveguide, the surface relief grating structure is formed in the layer of surface relief grating medium and the input coupler includes an additional surface relief grating structure formed in the layer of surface relief grating medium.

In accordance with another embodiment, the display system includes an input coupler configured to couple the image light into the waveguide; an output coupler configured to couple the image light out of the waveguide; and a cross-coupler that is separate from the surface relief grating structure, the cross-coupler is configured to redirect, towards the output coupler, the image light coupled into the waveguide by the input coupler.

In accordance with an embodiment, a display system for displaying image light, the display system is provided that includes a waveguide; a light source configured to generate infrared light; an input coupler configured to couple the image light into the waveguide; an output coupler on the waveguide and configured to couple the image light out of the waveguide; and a diffractive grating structure on the waveguide, the diffractive grating structure is configured to form a cross-coupler for the image light, is configured to couple the infrared light into the waveguide, and is configured to couple the infrared light out of the waveguide.

In accordance with another embodiment, the display system includes an image sensor, the diffractive grating structure is configured to couple, into the waveguide, reflected infrared light received from the eye box, and the diffractive grating structure is configured to couple, out of the waveguide and towards the image sensor, the reflected infrared light.

In accordance with another embodiment, the image sensor is configured to generate image sensor data based on the reflected infrared light, the display system includes control circuitry configured to perform gaze tracking operations based on the image sensor data.

In accordance with another embodiment, the diffractive grating structure includes a linear surface relief grating.

In accordance with another embodiment, the surface relief grating includes a two-dimensional surface relief grating having repeating unit cells arranged in a two-dimensional lattice.

In accordance with another embodiment, the display system includes an additional waveguide, the input coupler is configured to couple a first set of wavelength bands of the image light into the waveguide and is configured to transmit a second set of wavelength bands of the image light to the additional waveguide; an additional input coupler configured to couple the second set of wavelength bands of the image light into the additional waveguide; an additional output coupler on the additional waveguide and configured to couple the second set of wavelength bands of the image light out of the additional waveguide; and an additional diffractive grating structure on the waveguide, the additional diffractive grating structure is configured to form a cross-coupler for the second set of wavelength bands of the image light, is configured to couple the infrared light into the additional waveguide, and is configured to couple the infrared light out of the additional waveguide, the diffractive grating structure includes a first surface relief grating and the additional diffractive grating structure includes a second surface relief grating.

The foregoing is merely illustrative and various modifications can be made to the described embodiments. The foregoing embodiments may be implemented individually or in any combination.

What is claimed is:

1. A display system comprising:
   a waveguide configured to direct image light having a visible wavelength;
   a light source configured to generate infrared light;
   a surface relief grating on the waveguide;
   an output coupler on the waveguide and configured to couple the image light out of the waveguide, wherein the surface relief grating is configured to diffract the image light towards the output coupler and is configured to diffract the infrared light onto an output angle that is outside a total internal reflection (TIR) range of the waveguide; and
   control circuitry configured to perform gaze tracking operations based at least in part on the infrared light diffracted by the surface relief grating.

2. The display system of claim 1, further comprising:
   an input coupler on the waveguide and configured to couple the image light into the waveguide, wherein the surface relief grating is configured to diffract, from an incident angle within the TIR range of the waveguide, the image light coupled into the waveguide by the input coupler.

3. The display system of claim 2, wherein the surface relief grating is configured to couple the infrared light into the waveguide, the infrared light coupled into the waveguide is configured to reflect off of a surface of the waveguide, and the surface relief grating is configured to diffract, onto the output angle and out of the waveguide, the infrared light that has reflected off of the surface of the waveguide.

4. The display system of claim 1, wherein the output coupler is laterally offset from the surface relief grating.

5. The display system of claim 4, wherein the input coupler comprises an input coupling prism mounted to the waveguide.

6. The display system of claim 5, wherein the output coupler comprises a set of volume holograms.

7. The display system of claim 5, wherein the output coupler comprises a louvered mirror.

8. The display system of claim 4, wherein the input coupler comprises a set of volume holograms.

9. The display system of claim 4, wherein the input coupler comprises a first additional surface relief grating that is different from the surface relief grating and the output coupler comprises a second additional surface relief grating that is different from the surface relief grating and the first additional surface relief grating.

10. The display system of claim 9, further comprising:
a surface relief grating medium layered onto the waveguide, wherein the surface relief grating, the first additional surface relief grating, and the second additional surface relief grating are formed in the surface relief grating medium.

11. The display system of claim 1, further comprising:
a sensor, wherein the surface relief grating is configured to receive reflected infrared light, the surface relief grating is configured to couple the reflected infrared light into the waveguide, the reflected infrared light is configured to reflect off of the surface of the waveguide, the surface relief grating is configured to diffract, out of the waveguide and towards the sensor, the reflected infrared light that has reflected off of the surface of the waveguide, the sensor is configured to generate sensor data based on the reflected infrared light diffracted out of the waveguide by the surface relief grating, and the control circuitry is configured to perform the gaze tracking operations based at least in part on the sensor data.

12. The display system of claim 1, wherein the surface relief grating is configured to receive the infrared light from an incident angle outside the waveguide.

13. The display system of claim 1, further comprising:
an additional waveguide; and
an additional surface relief grating on the additional waveguide, wherein the surface relief grating is configured to diffract a first portion of the infrared light and the additional surface relief grating is configured to diffract a second portion of the infrared light that is not diffracted by the surface relief grating, wherein the surface relief grating is configured to diffract the infrared light towards an eye box and the additional surface relief grating is configured to diffract the portion of the infrared light towards the eye box, and wherein the infrared light comprises infrared light reflected from an eye box.

14. A display system comprising:
a waveguide configured to direct image light;
a surface relief grating structure on the waveguide, wherein the surface relief grating structure is configured to:
receive reflected infrared light,
couple the reflected infrared light into the waveguide, and
couple the reflected infrared light out of the waveguide after the reflected infrared light has reflected at least once off of a surface of the waveguide;
an image sensor configured to generate image sensor data based on the reflected infrared light coupled out of the waveguide by the surface relief grating structure; and
control circuitry configured to perform gaze tracking operations based at least in part on the image sensor data.

15. The display system of claim 14, further comprising:
an input coupler configured to couple the image light into the waveguide; and
an output coupler configured to couple the image light out of the waveguide, wherein the surface relief grating structure is configured to redirect, towards the output coupler, the image light coupled into the waveguide by the input coupler.

16. The display system of claim 15, wherein the surface relief grating structure is configured to expand the image light in at least one direction.

17. The display system of claim 15, further comprising:
a layer of surface relief grating medium on the waveguide, wherein the surface relief grating structure is formed in the layer of surface relief grating medium and wherein the output coupler comprises an additional surface relief grating structure formed in the layer of surface relief grating medium.

18. The display system of claim 15, further comprising:
a layer of surface relief grating medium on the waveguide, wherein the surface relief grating structure is formed in the layer of surface relief grating medium and wherein the input coupler comprises an additional surface relief grating structure formed in the layer of surface relief grating medium.

19. The display system of claim 14, further comprising:
an input coupler configured to couple the image light into the waveguide;
an output coupler configured to couple the image light out of the waveguide; and
a cross-coupler that is separate from the surface relief grating structure, wherein the cross-coupler is configured to redirect, towards the output coupler, the image light coupled into the waveguide by the input coupler.

20. A display system for displaying image light, the display system comprising:
a waveguide;
a light source configured to generate infrared light;
an input coupler configured to couple the image light into the waveguide;
an output coupler on the waveguide and configured to couple the image light out of the waveguide; and
a diffractive grating on the waveguide, wherein the diffractive grating is configured to direct the image light towards the output coupler, is configured to diffract the infrared light into the waveguide at a first angle within a total internal reflection (TIR) range of the waveguide, and is configured to diffract, out of the waveguide and at a second angle outside the TIR range of the waveguide, the infrared light diffracted into the waveguide by the diffractive grating after the infrared light diffracted into the waveguide by the diffractive grating has reflected off a surface of the waveguide via TIR.

21. The display system of claim 20, further comprising:

an image sensor, wherein the diffractive grating is configured to couple, into the waveguide, reflected infrared light received from an eye box, and wherein the diffractive grating is configured to couple, out of the waveguide and towards the image sensor, the reflected infrared light.

22. The display system of claim 21, wherein the image sensor is configured to generate image sensor data based on the reflected infrared light, the display system further comprising:

control circuitry configured to perform gaze tracking operations based on the image sensor data.

23. The display system of claim 21, wherein the diffractive grating comprises a linear surface relief grating.

24. The display system of claim 21, wherein the diffractive grating comprises a two-dimensional surface relief grating having repeating unit cells arranged in a two-dimensional lattice.

25. The display system of claim 20, further comprising:

an additional waveguide, wherein the input coupler is configured to couple a first set of wavelength bands of the image light into the waveguide and is configured to transmit a second set of wavelength bands of the image light to the additional waveguide;

an additional input coupler configured to couple the second set of wavelength bands of the image light into the additional waveguide;

an additional output coupler on the additional waveguide and configured to couple the second set of wavelength bands of the image light out of the additional waveguide; and an additional diffractive grating on the waveguide, wherein the additional diffractive grating is configured to form a cross-coupler for the second set of wavelength bands of the image light, is configured to couple the infrared light into the additional waveguide, and is configured to couple the infrared light out of the additional waveguide, the diffractive grating comprising a first surface relief grating and the additional diffractive grating comprising a second surface relief grating.

* * * * *